US011022453B2

(12) United States Patent
Duquene et al.

(10) Patent No.: US 11,022,453 B2
(45) Date of Patent: Jun. 1, 2021

(54) ALTERNATIVE ROUTE DECISION MAKING

(71) Applicant: International Business Machines Corporation, Armonk, NY (US)

(72) Inventors: Joel Duquene, Raleigh, NC (US); Morris S. Johnson, Jr., Cary, NC (US); Shelton M. Jones, II, Durham, NC (US); Adrienne Miller, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 16/137,959

(22) Filed: Sep. 21, 2018

(65) Prior Publication Data
US 2020/0096354 A1    Mar. 26, 2020

(51) Int. Cl.
*G01C 21/20* (2006.01)
*G01C 21/34* (2006.01)

(52) U.S. Cl.
CPC ......... *G01C 21/3484* (2013.01); *G01C 21/20* (2013.01)

(58) Field of Classification Search
CPC .. G08G 1/096822; G08G 1/01; G08G 1/0104; G08G 1/0145; G01C 21/34; G01C 21/3415; G01C 21/3492
See application file for complete search history.

(56) References Cited

U.S. PATENT DOCUMENTS

| | | | |
|---|---|---|---|
| 9,299,251 B2 | 3/2016 | Scofield et al. | |
| 9,755,850 B2 | 9/2017 | Stolfus | |
| 2005/0256641 A1 | 11/2005 | Ollis et al. | |
| 2006/0224302 A1 | 10/2006 | Kwok et al. | |
| 2008/0027646 A1 | 1/2008 | Kawabata | |
| 2010/0125411 A1* | 5/2010 | Goel | H04W 4/02 701/533 |
| 2011/0231087 A1* | 9/2011 | Johnson | G01C 21/3461 701/533 |
| 2012/0046860 A1* | 2/2012 | Curtis | G01C 21/00 701/418 |

(Continued)

OTHER PUBLICATIONS

"Method and System for Automatically Suggesting Routes to Users based on Vehicle Driving Patterns"; An IP.com Prior Art Database Technical Disclosure; IP.com No. IPCOM000246012D; IP.com Electronic Publication Date: Apr. 26, 2016; 2 Pages.

*Primary Examiner* — Anshul Sood
(74) *Attorney, Agent, or Firm* — Cantor Colburn LLP; Teddi Maranzano

(57) ABSTRACT

Recommended route change verification via a navigation system. The navigation system receives a destination from a user and then determines an initial route to the destination. While navigating along the initial route, the navigation system can determine a route change to the destination. Also, a convergence point is determined along where the initial route and the first route change converge. In order to verify that the route change is faster than continuing along the initial route, a first group of users utilizing the navigation system are routed along the initial route to the convergence point and a second group of other users are routed along the first route change to the convergence point. If more of the first group of users pass the convergence point before the second group of users, then the route change is recommended to the user rather than continuing along the initial route.

14 Claims, 4 Drawing Sheets

(56) References Cited

U.S. PATENT DOCUMENTS

| | | |
|---|---|---|
| 2012/0179363 A1 | 7/2012 | Pierfelice |
| 2014/0074392 A1* | 3/2014 | Holm ................. G01C 21/3415 |
| | | 701/400 |
| 2015/0253144 A1 | 9/2015 | Rau et al. |
| 2017/0314945 A1 | 11/2017 | Konig et al. |

* cited by examiner

ALTERNATIVE ROUTE DECISION MAKING

BACKGROUND

The invention relates generally to vehicle navigation, and more particularly, to recommending alternative routes.

Navigation systems today provide directions to guide a vehicle along roads from an origin to a destination. However, the initial route planned by the navigation system to get from the origin to the destination sometimes changes. During the trip, the navigation system can provide one or more alternative routes to the destination.

Typically, an alternative route is proposed because it would take the least amount of time to get to the destination or is simply proposed because it is the shortest distance. However, unbeknownst to the driver, once an alternative route is selected it could take longer to get to the destination than if the driver had continued along the initial route. This sometimes is because the driver is unfamiliar with the alternative route or the alternative route is actually more difficult to drive. Thus, it is not always practical to take an alternative route when proposed by the navigation system.

SUMMARY

According to a non-limiting embodiment, a method for recommending alternative routes via a navigation system is provided. The method includes receiving a destination as input to the navigation system, determining an initial route to the destination, and then determining a first route change to the destination. The method also includes determining a convergence point at which the initial route and the first route change converge, routing a first plurality of users utilizing the navigation system along the initial route to the convergence point, and routing a second plurality of users utilizing the navigation system along the first route change to the convergence point. The method then includes recommending the first route change to a user based on a comparison of the first plurality of users passing the convergence point with the second plurality of users passing the convergence point.

According to another non-limiting embodiment, a system for recommending alternative routes is provided. The system includes a processor coupled to a memory unit, wherein the processor is configured to execute program instructions for receiving a destination from a user, determining an initial route to the destination to provide to the user, and receiving a location of the user along the initial route. Executing the program instructions also includes determining a first route change from the location of the user along the initial route to the destination and determining a convergence point at which the initial route and the first route change converge. Also, the program instructions include routing a first plurality of users along the initial route to the convergence point, routing a second plurality of users along the first route change to the convergence point, and receiving data from one or more of the first plurality of users upon passing the convergence point and one or more of the second plurality of users upon passing the convergence point. The program instructions then include comparing the data received from the first and second plurality of users and recommending to the user the first route change to the destination over continuing along the initial route to the destination based upon the comparison of the data received from the first and second plurality of users.

According to yet another non-limiting embodiment, a computer program product is provided. The computer program product includes a computer readable storage medium having program instructions embodied therewith, the program instructions executable by a computer processor to cause the computer processor to perform a method for recommending alternative routes. The method includes receiving a destination as input to the navigation system, determining an initial route to the destination, and determining a first route change to the destination. The method also includes determining a convergence point at which the initial route and the first route change converge, routing a first plurality of users utilizing the navigation system along the initial route to the convergence point, and routing a second plurality of users utilizing the navigation system along the first route change to the convergence point. The method then includes recommending the first route change to a user based on a comparison of the first plurality of users passing the convergence point with the second plurality of users passing the convergence point.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

Figure 1:
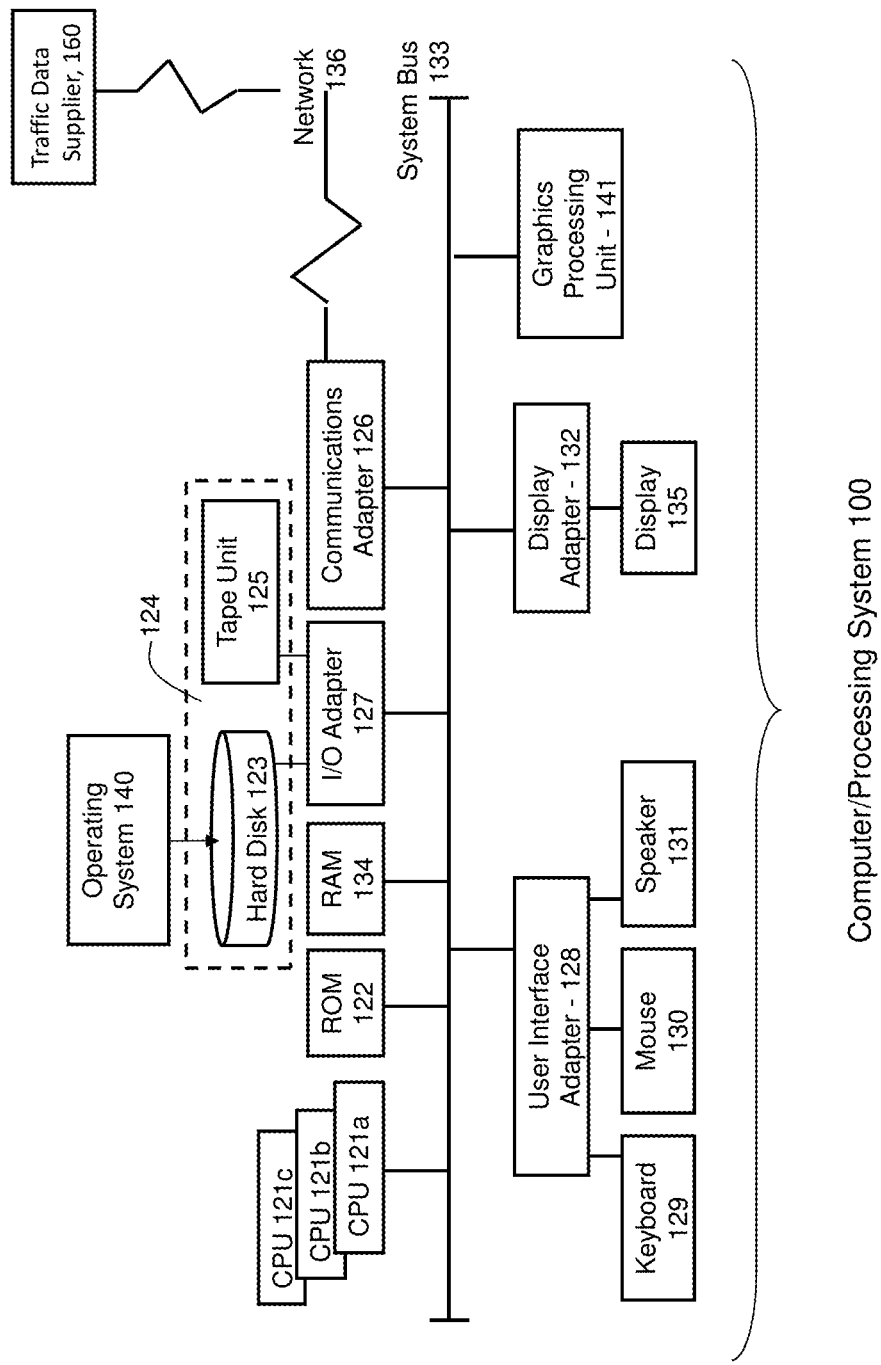
FIG. 1 depicts a block diagram illustrating an exemplary computer processing system that may be utilized to implement exemplary embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern navigation systems allow a vehicle operator to navigate to a selected destination and then reroute from the initial route to avoid traffic or to take detours. However, the proposed routes are not always quicker because of delays unbeknownst to the navigation system. As described herein, one or more embodiments address shortcomings of the prior art by using a navigation system that verifies any route changes being proposed to the vehicle operator.

Referring to FIG. 1, there is shown an embodiment of a processing system, commonly referred to as a computer system 100, configured as a vehicular navigation system, which communicates over a communications network to one or more servers of a central navigation system, for implementing the teachings herein. The computer system 100 may be implemented as part of a vehicle or as a stand-alone device. The computer system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124.

Operating system 140 for execution on the processing system 100 may be stored in mass storage 124. However, the operating system 140 may also be stored in RAM 134 of the computer system 100. Operating systems useful in planning a route for a convoy of automobiles according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 124, input means such as keyboard 129 and mouse 130, and output capability including speaker 131 and display 135. In one embodiment, a portion of RAM 134 and mass storage 124 collectively store the operating system to coordinate the functions of the various components shown in FIG. 1.

Figure 2:
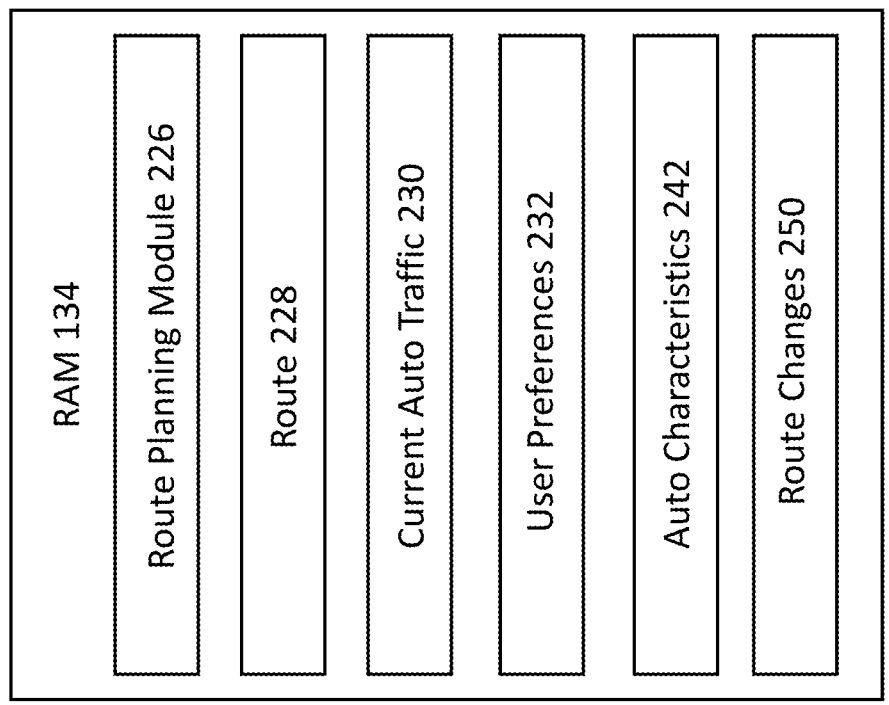
FIG. 2 depicts a block diagram illustrating an exemplary random access memory of the computer processing system of FIG. 1 according to one or more embodiments of the present invention.

Referring to FIG. 2, stored in RAM 134 is a route planning module 226 of computer program instructions for planning routes for a vehicle between an origin and a destination based on a location of the vehicle and a destination selected by the user/operator of the vehicle. The route planning module 226 supports planning an initial route 228 from an origin to a destination depending upon current automobile traffic 230 between the origin and the destination. Also, the route may also depend on automobile characteristics 242 and any user preferences 232. Once the route 228 is planned, the route planning module 226 may report the route 228 to the traffic data supplier 160. A route planning module 226 of one or more other vehicles may then receive one or more routes 228 from the traffic data supplier 160. Data from the traffic data supplier 160 may be used to reroute a vehicle off of an initial route to a particular destination and onto an alternative route or route change 250 that is intended to be more expedient. While traveling to a destination, more than one route change 250 may be provided.

The user/operator determines whether to use one or more route changes 250 by selecting a particular route change 250. Otherwise, the user/operator can continue to follow the initial route 228. If a vehicle operator deviates from the initial route 228, a route change 250 can then be provided. Other than the automobile traffic and obstacles in the driving path in or along a roadway, there may be temporary obstructions, visibility issues, and/or vehicle capability issues relative to traversing a particular route along the roadway. For example, there may be a difficult turn, school starting or letting out, a steep incline or decline, a bridge or narrowing of the road that results in delays traveling along a route provided by a navigation system. Delays such as these are often unreported especially by drivers who are used to driving in that area. Thus, a navigation system proposing a route change may have not taken delaying factors such as these into account. When these delays exist unbeknownst to the navigation system and the operator/user, the operator/user then cannot be sure as to whether a proposed route change should be accepted.

Figure 3:
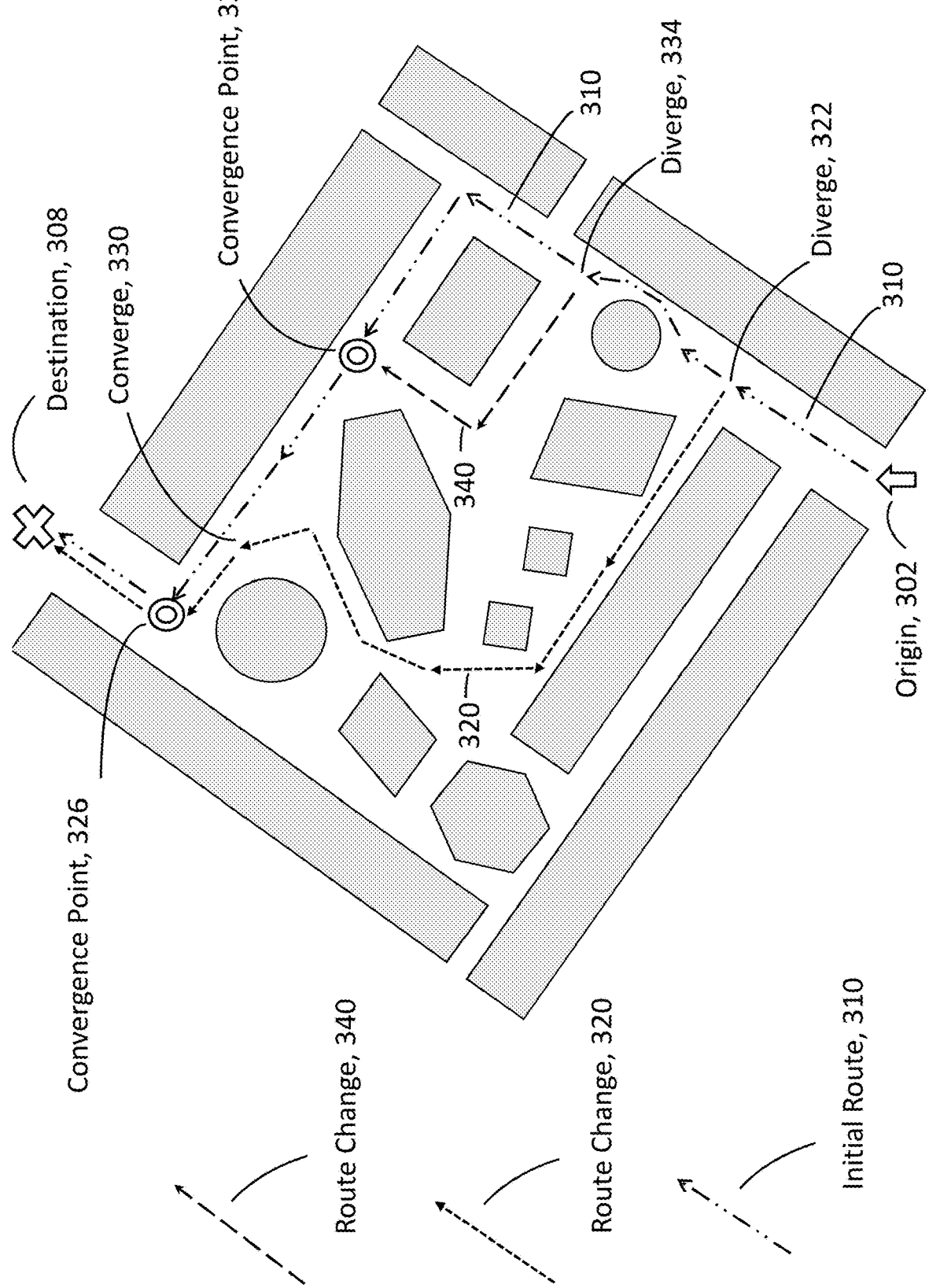
FIG. 3 is a depiction of an exemplary vehicle navigation session in which route changes to an initial route are proposed according to one or more embodiments of the present invention.

Referring now to FIG. 3, a user/operator at origin 302 can input into the computer system 100 a destination 308 via a user interface. In response, the route planning module 226 of the computer system 100 generates the initial route 310 from the origin 302 to the destination 308 which is provided as output via the user interface. However, a route change 320 is generated because of, for example, traffic. Route change 320 deviates from the initial route 310 at reference number 322 and then converges with the initial route 310. As shown in FIG. 3, the initial route 310 and the route change 320 begin to converge at reference number 330. Thus, the initial route 310 and the route change 320 overlap from the convergence at 330 to the destination 308. A point along the overlap is designated as the convergence point 326 which is used for comparison purposes for vehicles traveling the initial route 310 and the route change 320. In FIG. 3, the convergence point 326 is positioned before the destination 308. Vehicles proceeding along either the initial route 310 or the route change 320 passes the convergence point 326 on their way to the destination 308. A portion of the initial route 310 between the convergence point 326 and the destination 308 overlaps with a portion of the route change 320 between the convergence point 326 and the destination. In one or more embodiments, however, the convergence point 326 and the destination 308 may be the same.

In order for the computer system 100 to generate and display the route change 320 to a vehicle operator for selection, the computer system 100 can retrieve data from traffic data supplier 160 where a first group of other vehicles traveling toward the destination 308 are routed along the initial route 310 past the convergence point 326 and another different second group of vehicles traveling toward the destination 308 are routed along the route change 320 past the same convergence point 326. The computer system 100 via the route planning module 226 and route changes 250 can then recommend via the user interface the route change 320, or not, to a particular user/operator based on a comparison of the first group of users that traveled along the initial path 310 to the convergence point 326 with the other second group of users that traveled along the route change 320 to the convergence point 326.

In one or more embodiments, the determination is made, via the comparison, that more users from the second group of users traveling the route change 320 passed the convergence point 326 before a similar number of users from the first group of users traveling the initial route 310. For example, the number of users from each group could be counted that pass the convergence point 326 within a period of time. Alternatively, the comparison could include recommending to a particular vehicle operator to change course to the route change 320 where the route change 320 was verified based on data utilized by the route planning module 226. For example, at least a portion of a particular group of vehicles got to the convergence point 326 first or more quickly than a portion of a group of other vehicles did. Also, for example, one or more of the second group of users pass the convergence point 326 before any of the first group of users.

The route change 320 could continue to be recommended to users other than the first and second groups of users that are using the same or similar navigation systems having route planning models 226 and that may include accessing the traffic data supplier 160 until a number of users of the first group of users passing the convergence point 326 exceed the number of users of the second group of users passing the convergence point 326. Also, other users may continue to be directed along the initial route 310 rather than the route change 320 in order to avoid creating traffic congestion along the route change 320 or when the delay no longer exists or an obstacle is removed along the initial route 310.

After deciding to proceed along the initial route 310, additional delays can occur prompting additional route changes such as second route change 340 to destination 308. In such case, the route planning module 226 of computer system 100 determines the second route change 340 to the destination 308. As shown in FIG. 3, the second route change 340 corresponds with at least a portion of the initial route 310 including the destination 308. The second route change 340 diverges from the initial route 310 at reference number 334 and then converges again with the initial route 310 at second convergence point 336. Thus, the delay exists along initial route 310 between reference number 334 and second convergence point 336.

In order to verify that the second route change 340 is more expedient than the initial route 310, the computer system 100 determines second convergence point 336 where the initial route 310 and the second route change 340 converge. In addition to the first and second groups of users using the initial route 310 and route change 320 to convergence point 326, respectively, the computer system 100 routes a third group of users utilizing the navigation system along the initial route 310 to the convergence point 336 and routes a fourth group of users utilizing the navigation system along the second route change 340 to the convergence point 336. The computer system 100 via the route planning module 226 and the route changes 250 can then recommend the second route change 340 to the user based on a comparison of the third group of users passing the convergence point 336 with the fourth group of users passing the convergence point 336.

In one or more embodiments, the second route change 340 can be utilized for determining the convergence point 326 upon which the initial route 310 and the first and second route changes 320, 340 converge. In such case, a third group of users utilizing the navigation system would be routed along the second route change 340 to the convergence point 326. The computer system 100 via the route planning module 226 and route changes 250 recommends the second route change 340 to the user based on a comparison of the first, second and third group of users passing the convergence point 326.

Figure 4:
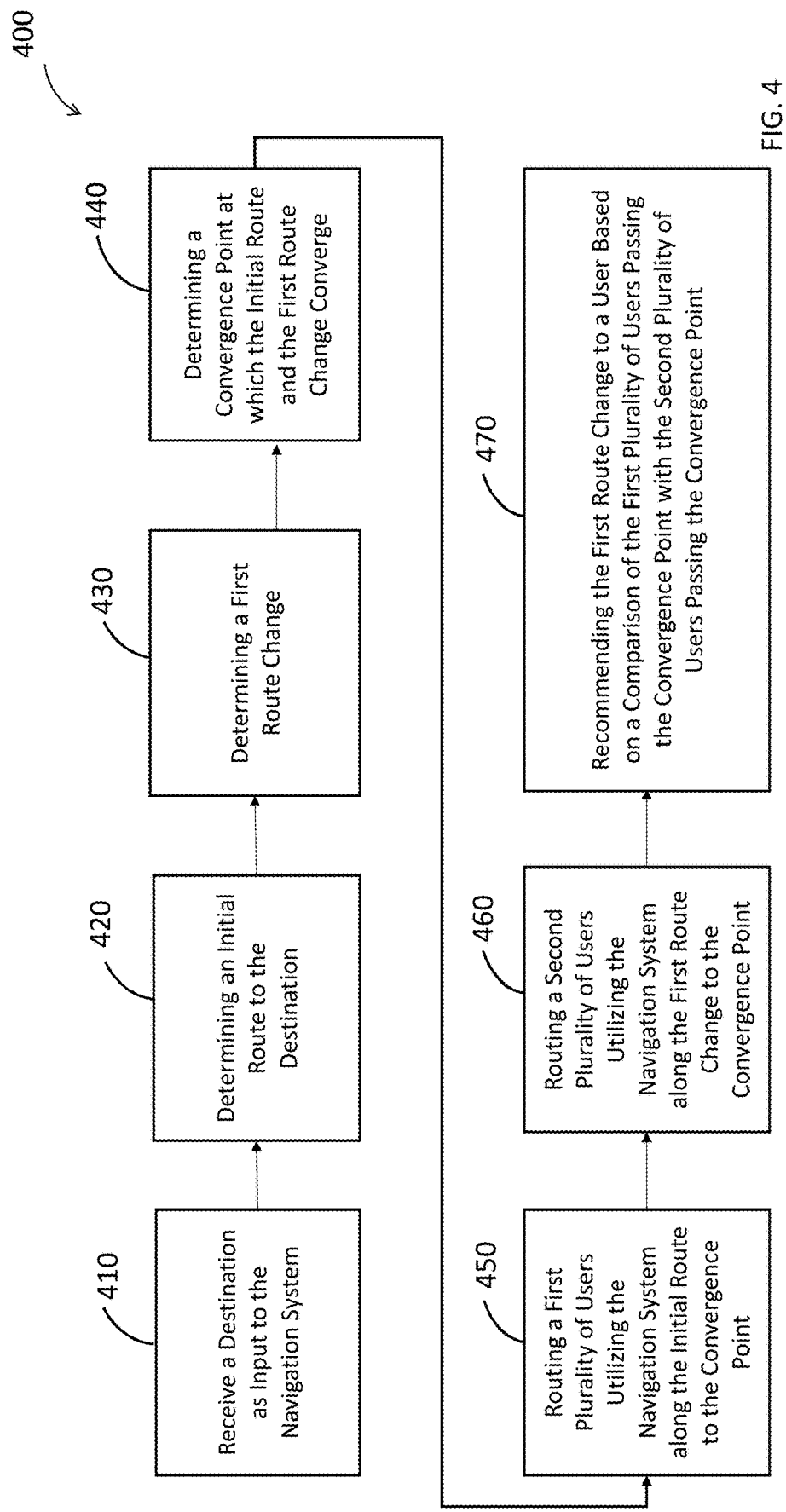
FIG. 4 is a flow diagram illustrating a method for verifying recommended alternative routes via the navigation system according to one or more embodiments of the present invention.

Turning to FIG. 4, one or more embodiments may include a method 400 for recommending alternative routes via a navigation system. The flow diagram of FIG. 4 illustrates the method 400 that includes process block 410 for receiving a destination 308 as input to the navigation system. The method 400 then includes process block 420 for determining an initial route 310 to the destination 308, process block 430 for determining a first route change 320 to the destination 308 and process block 440 for determining a convergence point 326 at which the initial route 310 and the first route change 320 converge. The method 400 also includes process block 450 for routing a first plurality of users utilizing the navigation system along the initial route 310 to the convergence point 326 and process block 460 for routing a second plurality of users utilizing the navigation system along the first route change 320 to the convergence point 326. The method 400 then includes process block 470 for recommending the first route change 320 to a user based on a comparison of the first plurality of users passing the convergence point 326 with the second plurality of users passing the convergence point 326.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recommending alternative routes via a navigation system, the method comprising:
   receiving a destination as input to the navigation system;
   determining an initial route to the destination;
   determining a first route change to the destination;
   determining a convergence point at which the initial route and the first route change converge;
   routing a first plurality of users utilizing the navigation system along the initial route to the convergence point;
   routing a second plurality of users utilizing the navigation system along the first route change to the convergence point;
   recommending the first route change to a user based on a comparison of the first plurality of users passing the convergence point with the second plurality of users passing the convergence point, wherein the comparison comprises counting a number of users of the first plurality of users passing the convergence point within a period of time and a number of users of the second plurality of users passing the convergence point within the period of time, and comparing the counts; and
   continuing to recommend the first route change to other users until the count of the number of users of the first plurality of users passing the convergence point exceeds the count of the number of users of the second plurality of users passing the convergence point in a subsequent period of time.

2. The method of claim 1 wherein the comparison further comprises determining that one or more of the second plurality of users passes the convergence point before any of the first plurality of users.

3. The method of claim 1 wherein the destination and the convergence point are the same.

4. The method of claim 1 wherein the convergence point is before the destination.

5. The method of claim 1 further comprising directing other users along the initial route rather than the first route change.

6. The method of claim 1 further comprising:
   determining a second route change to the destination;
   determining a second convergence point upon which the initial route and the second route change converge;
   routing a third plurality of users utilizing the navigation system along the initial route to the second convergence point;
   routing a fourth plurality of users utilizing the navigation system along the second route change to the second convergence point; and
   recommending the second route change to the user based on a comparison of the third plurality of users passing the second convergence point with the fourth plurality of users passing the second convergence point.

7. The method of claim 6 wherein the second route change corresponds with at least a portion of the initial route including the destination.

8. The method of claim 1 further comprising:
   determining a second route change to the destination;
   utilizing the second route change for determining the convergence point upon which the initial route and the first and second route changes converge;
   routing a third plurality of users utilizing the navigation system along the second route change to the convergence point; and
   recommending the second route change to the user based on a comparison of the first, second and third plurality of users passing the convergence point.

9. A system for recommending alternative routes, the system comprising:
   a processor coupled to a memory unit, wherein the processor is configured to execute program instructions comprising:
   receiving a destination from a user;
   determining an initial route to the destination to provide to the user;
   receiving a location of the user along the initial route;
   determining a first route change from the location of the user along the initial route to the destination;
   determining a convergence point at which the initial route and the first route change converge;
   routing a first plurality of users along the initial route to the convergence point;

routing a second plurality of users along the first route change to the convergence point;

receiving data from one or more of the first plurality of users upon passing the convergence point and one or more of the second plurality of users upon passing the convergence point;

recommending to the user the first route change to the destination over continuing along the initial route to the destination based on a comparison of the data received from the first and second plurality of users, wherein the comparison comprises counting a number of users of the first plurality of users passing the convergence point within a period of time and a number of users of the second plurality of users passing the convergence point within the period of time, and comparing the counts; and continuing to recommend the first route change to other users until the count of the number of users of the first plurality of users passing the convergence point exceeds the count of the number of users of the second plurality of users passing the convergence point in a subsequent period of time.

10. The system of claim 9 wherein comparing the data further comprises determining that one or more of the second plurality of users passes the convergence point before any of the first plurality of users.

11. The system of claim 9 further comprising a user interface, wherein the user interface receives user input from the user and provides output to the user, and wherein the user interface recommends the first route change over continuing along the initial route to the destination.

12. A computer program product comprising a non-transitory computer readable storage medium having program instructions embodied therewith, the program instructions executable by a computer processor to cause the computer processor to perform a method for recommending alternative routes, comprising:

receiving a destination as input to a navigation system;
determining an initial route to the destination;
determining a first route change to the destination;
determining a convergence point at which the initial route and the first route change converge;
routing a first plurality of users utilizing the navigation system along the initial route to the convergence point;
routing a second plurality of users utilizing the navigation system along the first route change to the convergence point;
recommending the first route change to a user based on a comparison of the first plurality of users passing the convergence point with the second plurality of users passing the convergence point, wherein the comparison comprises counting a number of users of the first plurality of users passing the convergence point within a period of time and a number of users of the second plurality of users passing the convergence point within the period of time, and comparing the counts; and
continuing to recommend the first route change to other users until the count of the number of users of the first plurality of users passing the convergence point exceeds the count of the number of users of the second plurality of users passing the convergence point in a subsequent period of time.

13. The computer program product of claim 12 wherein the comparison further comprises determining that one or more of the second plurality of users passes the convergence point before any of the first plurality of users.

14. The computer program product of claim 12 further comprising directing other users along the initial route rather than the first route change.

* * * * *